United States Patent

Eslambolchi et al.

[11] Patent Number: 5,875,422
[45] Date of Patent: Feb. 23, 1999

[54] AUTOMATIC LANGUAGE TRANSLATION TECHNIQUE FOR USE IN A TELECOMMUNICATIONS NETWORK

[75] Inventors: Hossein Eslambolchi, Basking Ridge; Roger A. Jasko, Blairstown, both of N.J.; Frank Sinkovits, III, Allentown, Pa.

[73] Assignee: AT&T Corp., Middletown, N.J.

[21] Appl. No.: 792,326

[22] Filed: Jan. 31, 1997

[51] Int. Cl.$^6$ .............................. G06F 17/28; H04M 1/00
[52] U.S. Cl. .................. 704/3; 704/8; 379/88.06
[58] Field of Search .................. 704/2, 3, 4, 5, 704/6, 7, 8; 379/88.05, 88.06, 52, 114, 115

[56] References Cited

U.S. PATENT DOCUMENTS

| | | | |
|---|---|---|---|
| 4,882,681 | 11/1989 | Brotz | 704/3 |
| 5,075,850 | 12/1991 | Asahioka et al. | 704/2 |
| 5,175,684 | 12/1992 | Chong | 704/3 |
| 5,268,839 | 12/1993 | Kaji | 704/3 |
| 5,295,068 | 3/1994 | Nishino et al. | 704/10 |
| 5,353,335 | 10/1994 | D'Urso et al. | 379/88.05 |
| 5,375,164 | 12/1994 | Jennings | 379/88.05 |
| 5,412,712 | 5/1995 | Jennings | 379/88.05 |
| 5,475,733 | 12/1995 | Eisdorfer et al. | 379/52 |
| 5,497,319 | 3/1996 | Chong et al. | 704/2 |
| 5,524,137 | 6/1996 | Rhee | 379/88.01 |
| 5,701,497 | 12/1997 | Yamuchi et al. | 704/3 |
| 5,724,526 | 3/1998 | Kunita | 704/277 |
| 5,784,456 | 7/1998 | Carey et al. | 379/419 |

OTHER PUBLICATIONS

Patent No. 5,528,491, filed on Aug. 31, 1992 and issued on Jun. 18, 1996 to Susumu Kuno et al.. Class: 704/9.
Patent No. 5,546,304, filed on Jun. 23, 1995 and issued on Aug. 13, 1996 to Jamie Marschner et al.. Class: 704/4.

Primary Examiner—Joseph Thomas
Attorney, Agent, or Firm—Robert B. Levy

[57] ABSTRACT

A telecommunications network (10) provides a connection between a calling and called parties (12, 12' and 14, 14', respectively) and advantageously translates information generated by the calling and called parties in accordance with language preferences entered by the called and calling parties, respectively.

15 Claims, 1 Drawing Sheet

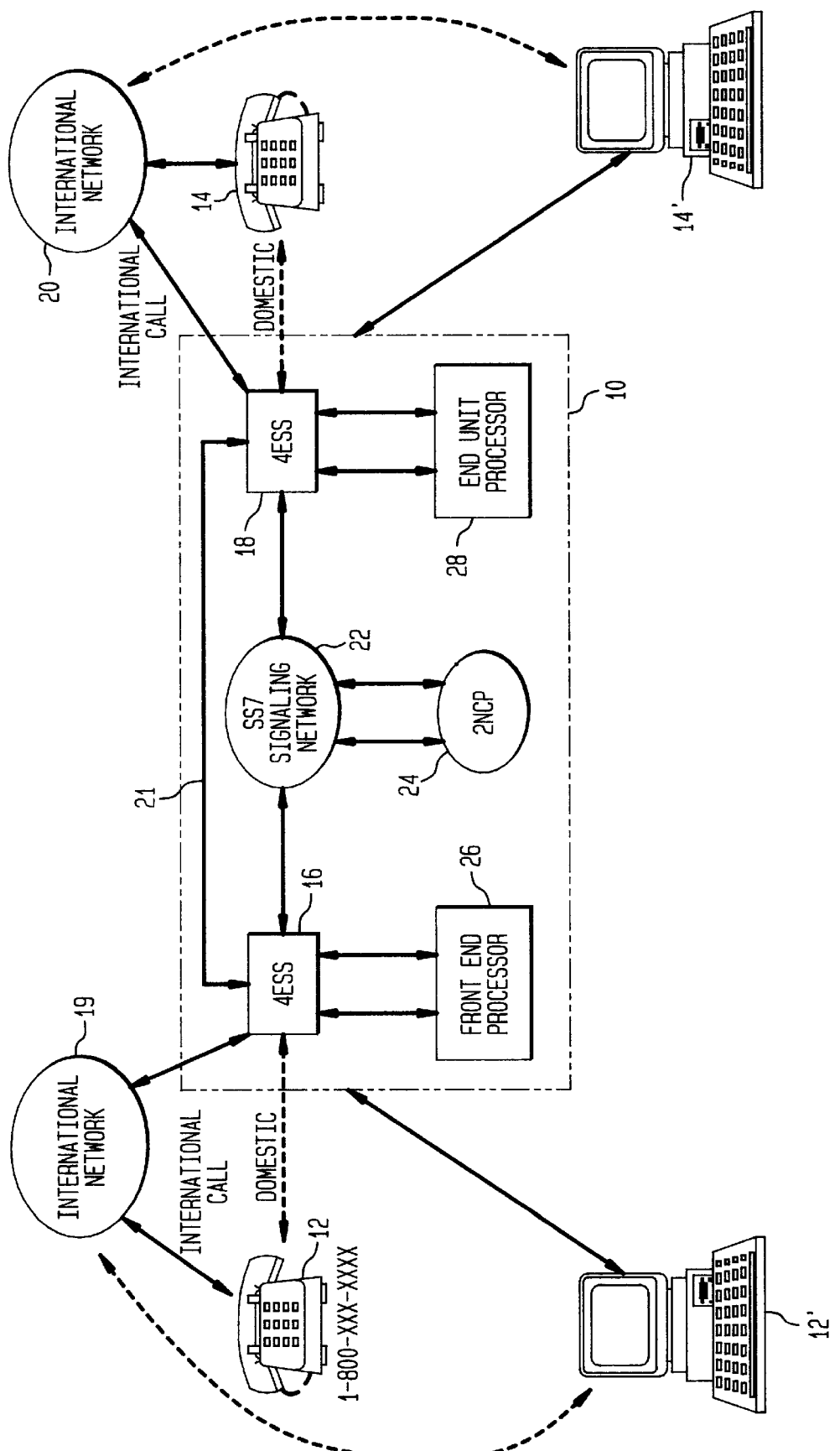

AUTOMATIC LANGUAGE TRANSLATION TECHNIQUE FOR USE IN A TELECOMMUNICATIONS NETWORK

TECHNICAL FIELD

This invention relates to a technique for use with a telecommunications network for automatically translating the information transmitted by a calling party and a called party.

BACKGROUND ART

Many businesses now buy and sell goods and services on a world-wide basis. With high speed transportation and communications facilities, national boundaries no longer serve as an impediment to international commerce. However, differences in language continue to hinder communications between individuals in different countries. To avoid language differences from interfering with business transactions, many businesses employ translators on a full-time basis for performing language translation whenever necessary. For large entities that regularly deal in international commerce, employing one or more translators is simply a cost of doing business.

For smaller companies, the cost of employing a translator on a full-time basis is often prohibitive. Thus, such companies usually hire translators on an as-needed basis. This approach may be satisfactory when the need for language translation is known in advance, allowing sufficient time to procure an individual capable of performing the needed translation. However, situations commonly arise when language translation is needed on an ad-hoc basis, such as when someone must suddenly place, or receive, a telephone call from someone speaking a different language, or when some one must send or receive text in a different language.

Thus, there is a need, especially in connection with a telecommunications network, for automatically translating the information generated by a calling and called parties.

BRIEF SUMMARY OF THE INVENTION

Briefly, in accordance with the invention, a technique is provided for use in a telecommunications network for automatically translating information (e.g., speech or text) generated by a calling and a called parties in accordance with language preferences established by the called and calling parties, respectively. In response to a calling party invoking an automatic language translation service (by dialing the number associated with that service), the service prompts the calling party to enter the number of each called party and a language translation preference for the information generated by that called party. Thereafter, a connection is established with the called party who is then prompted to enter a language preference for the information generated by the calling party. The information generated by each of the calling and called parties is translated in accordance with the language preference of the called and calling parties, respectively. During translation, the characteristics (e.g., the phase amplitude and frequency) of the calling and called parties' information is monitored and these characteristics are varied to maintain synchronism therebetween to improve the quality of the translation.

BRIEF DESCRIPTION OF THE DRAWING

FIG. 1 is block schematic diagram of a telecommunications network for implementing the automatic translation technique of the invention.

DETAILED DESCRIPTION OF THE DRAWING

FIG. 1 depicts an inter-exchange telecommunications network 10, such as the network maintained by AT&T, for carrying telecommunications traffic between a calling party, represented by station set 12, and a called party, represented by station set 14. The station sets 12 and 14 may be domestically located (i.e., both within the same country as the network 10). Under such conditions, the station sets 14 and 16 would be connected, via an originating and terminating Local Exchange Carriers (LECs) (not shown), respectively, to an originating and terminating toll switches 16 and 18, respectively, within the network 10. Alternatively, the station sets 12 and 14 may be internationally located (each in a country different that the network 10). Under such circumstances, the station sets 12 and 14 would be connected via originating and terminating international networks 19 and 20, respectively, to switches 16 and 18, respectively. Indeed, one of the station sets 12 and 14 may be located domestically, while the other may be located internationally in which case, the domestic set would be connected via a LEC to one of the switches 16 and 18, with the other station set connected by a corresponding international network to the other switch.

The toll switches 16 and 18 are typically interconnected via at least one voice trunk 21 to carry in-band between the station sets 12 and 14. Additionally, the switches 16 and 18 are interconnected via a signaling network 22, such as AT&T's SS7 network. The signaling network 22 allows the switches 16 and 18 to exchange out-of band signaling information associated with call set-up and tear down. Additionally, the signaling network 22 couples the switches 16 and 18 to a Network Control Point 24 (NCP) that provides the switches with information to assist with call set-up and tear down, as well as call processing generally. While the network 10 has been described as including only the originating and terminating switches 16 and 18, respectively, there may be additional linking (via) switches (not shown) connecting the originating and terminating switches.

In accordance with the invention, the network 10 advantageously translates the speech uttered by the calling party, via the station set 12, and the speech uttered by the called party, via station set 14 into a language selected by the called and calling parties, respectively. To provide such language translation, the network 10 includes front end processors 28 and 30 connected to switches 16 and 18, respectively. The front end processor 26 automatically translates the speech uttered by the called party (via station set 14) in accordance with a language preference entered by the calling party. The front end processor 28 automatic translates the speech uttered by the calling party (via station set 12) in accordance with a language preference entered by the called party 12. Moreover, the front end processors 26 and 28 also monitor the speech uttered by the calling and called parties, respectively, during translation, to determine certain characteristics associated with the uttered speech, such as frequency, amplitude, and phase. In accordance with the monitored characteristics, each of the front end processors 26 and 28 adjusts these characteristics to synchronize the called and calling party speech, thereby improving the quality of the translation.

The network 10 performs language translation in the following manner. To obtain language translation of the speech of a called party (i.e., station set 14), the calling party (i.e., station set 12) dials a telephone number associated the language translation service offered by the network. In practice, the language translation service typically possesses a toll free number typically (1-800-XXX-XXXX or 1-888-XXX-XXXX), although a local number could easily be used in the event that the language translation service is offered in a LEC network (not shown), in contrast to the interexchange network 10. In response to the call invoking the language translation service, the switch 16 signals the front end processor 26 to prompt the calling party to enter the number of the called party (i.e., the telephone number of station set 14). In response to the prompt, the calling party enters the number of the called party, either by way of DTMF signals, or by speaking the digits which are converted by the front end processor 26, using known voice recognition techniques, into electrical signals.

Following entry by the calling party of the number of the called party, the front end processor 26 prompts the calling party to enter a language translation preference for the speech of the called party. Typically, the front end processor 26 provides the calling party with an announcement of the form "Dial or speak one for English, two for French, three for German etc." Following receipt of the language preference entered by the called party, the switch 16 now launches a call via the switch 18 to the called party (i.e., the station set 14). In connection with the call, the switch 16 also sends signaling information, via the network 22, to the switch 18 indicating that the language translation service had been invoked.

Assuming that the called party answers the call launched from the switch 16, then the front end processor 28 prompts the called party (i.e., station set 14) to select a language translation preference for the speech uttered by the calling party (i.e., station set 12). Typically, the called party receives the same type of voice prompt provided to the calling party, namely to select a language preference for translation of the speech uttered by the other party. Should the called party be geographically located in a region whose residents primarily speak one language (say, Spanish), the prompt to the called party to would be in that language. After the called party has answered, signaling information is communicated back to the switch 16 to facilitate call set-up, and to initiate the desired billing, if any for the language translation service.

Once the calling and called parties are connected, the front end processors 26 and 28 translate the speech received from the called and calling parties, respectively, in accordance with the language preferences entered previously by the calling and called parties, respectively. Automatic language translation via computer may be carried out using a variety of techniques. For example, the translation may be carried out in accordance with the technique described in either of U.S. Pat. Nos. 5,546,304 or 5,528,491, both incorporated by reference herein.

To facilitate translation of the speech uttered by the calling and called parties, the front end processors 26 and 28 desirably monitor certain characteristics of the incoming speech from the called and calling parties, respectively, undergoing translation. In particular, the front end processors 26 and 28 periodically monitor the amplitude, frequency and phase of the uttered speech received at each processor. Typically, the processors 26 and 28 monitor these parameters not less than every 20–30 milliseconds. The information collected by each of the front end processors 26 and 28, is communicated, via the switches 16 and 18, and the signaling network 22 to the other front end processor. Each of the front end processors 16 and 18 then adjusts the frequency, amplitude and phase of the speech to match that of the speech received at other processor, so the processors remain synchronized to provide better translations.

The process of translating the calling and called party speech in this manner continues as long as the call between the calling and called parties continues. Should either of the calling or called parties terminate the call by hanging-up, information indicative of such call termination is communicated, via the signaling network 22, to the switches 16 and 18. In turn, the switches 16 and 18 signal the associated one of front end processors 26 and 28, respectively, to cease further translation until the translation service is invoked again.

As described above with respect to FIG. 1, the network 10 advantageously translates the speech uttered by a calling and a called party in accordance with the language preferences of the called and calling parties, respectively. Additionally, the network 10 could easily provide language translation for several callers on a single call. To that end, the calling party (i.e., station set 12) would invoke the language translation service in the manner described previously. Rather than enter the number associated with a single called party (i.e., station set 14), the calling party enters each called party's number the number in sequence, either by way of DTMF signals, or by speaking the called party's number. Thereafter, the calling party enters the language translation preference for the speech received from called parties. Typically, the speech of each called party is translated into one language in accordance with the language preference. However, for multiple called parties, it may be desirable to have different language preferences for different called parties. Thus, the calling party may desire to receive the call from one called party in English while choosing to hear the call from another called party in a different language.

After the calling party invokes the translation service and enters the called party numbers and language translation preference(s), then the network 10 launches a call to each called party. Each called party is prompted in the manner described previously to enter its language translation preference to its corresponding front end processor. Thereafter, language translation proceeds as before.

The network 10 may also translate not only speech but text as well. Referring to FIG. 1, the calling and called parties may be represented by terminals 12' and 14' (which may be fax or computer terminals, for example) in place of the station sets 12 and 14, respectively. (Alternatively, the terminals 12' and 14' may represent a second calling party and a second called party, respectively, in addition to the calling and called parties represented by the station sets 12 and 14, respectively.) To invoke the language translation service, the calling party, represented by the terminal 12', initiates a call to the switch 16 by entering the appropriate number or IP address. Depending on its location, the terminal 12' initiates the call via its corresponding LEC (not shown), or via the international network 19. After the call is established, the front end processor 26 prompts calling party, via the terminal 12', to enter the language translation preference, and the number (or IP address) of the called party (i.e., the number of terminal 14').

After receipt of the number of the called party, the switch 16 launches a call to the called party (i.e., terminal 14') which is connected, either via its corresponding LEC (not shown), or via the international network 20, to the switch 18. Assuming the called party answers, then the front end processor 28 prompts the called party to indicate its language preference via the terminal 14'. Thereafter, the front end processors 26 and 28 translate text, entered via the terminals 14' and 12', respectively, for receipt at the terminals 12' and 14', respectively.

During translation, the front end processors 26 and 28 desirably monitor certain characteristics of the incoming information from the terminals 14' and 12', respectively. In particular, the front end processors 26 and 28 periodically monitor the amplitude, frequency and phase of the information at each processor. Typically, the processors 26 and 28 monitor these parameters not less than every 20–30 milliseconds. The information collected by each of the front end processors 26 and 28, is communicated, via the switches 16 and 18, and the signaling network 22, to the other front end processor. Each of the front end processors 16 and 18 then adjusts the frequency, amplitude and phase of the information to match that of the other processor, so the processors remain synchronized to provide better translations.

The foregoing describes a technique for use in a telecommunications network for translating the information transmitted by a calling and called parties in accordance with a language preference of the called and calling parties, respectively, It is to be understood that the above-described embodiments are merely illustrative of the principles of the invention. Various modifications and changes may be made thereto by those skilled in the art which will embody the principles of the invention and fall within the spirit and scope thereof.

What is claimed is:

1. For use in a telecommunications network, a method for automatically translating information generated by a calling and a called party in accordance with language preferences of the called and calling parties, respectively, comprising the steps of:

prompting the calling party, in response to a call therefrom invoking a language translation service, to enter a number of at least one called party and a language preference for translation of information generated by the called party;

establishing a connection with the called party;

prompting the called party to enter a language preference for translation of speech uttered by the calling party;

automatically translating the information generated by the calling and by the called party in accordance with the language preferences entered by the called and calling parties, respectively;

monitoring characteristics of the information generated by the calling and called parties; and simultaneously with the translation, adjusting the characteristics of the information generated by the calling and called parties to achieve synchronism therebetween.

2. The method according to claim 1 wherein the information generated by the calling and called parties comprises speech.

3. The method according to claim 1 wherein the information generated by the calling and called parties comprises text.

4. The method according to claim 3 wherein the text is generated by a computer terminal.

5. The method according to claim 3 wherein the text is generated by a fax terminal.

6. The method according to claim 1 wherein the called party is prompted in a language associated with a region where the called party is located.

7. The method according to claim 1 wherein the number of the called party comprises a telephone number.

8. The method according to claim 1 wherein the number of the called party comprises an IP address.

9. The method according to claim 1 wherein the monitored characteristics are frequency, amplitude and phase.

10. The method according to claim 1 wherein:

the called party enters a plurality of numbers in sequence, each associated with a separate party to be called;

a call is launched to each party to be called;

each called party is prompted to enter a language translation preference; and the language of the calling party is translated into the language preference of each called party.

11. The method according to claim 10 wherein:

the calling party enters a separate language translation preference for each called party; and the language of each called party is translated in accordance with the translation preference for that party.

12. The method according to claim 1 wherein the calling and called parties are located domestically.

13. The method according to claim 1 wherein the calling and called parties are located internationally.

14. The method according to claim 1 wherein one of the calling and called parties may be located domestically and another located internationally.

15. A telecommunications network for completing a call between a calling and called party and for translating information generated by the calling and called parties, comprising:

an originating telecommunications switch for making a connection to the calling party;

a terminating telecommunications switch for making a connection to the called party;

means for passing in-band traffic between the originating and terminating switches so a connection can be made through the switches between the calling and called parties;

means for passing out-of band signaling information between the switches; and first and second front end processors connected to the originating and terminating switches, respectively, the first front end processor prompting the calling party, in response to a call therefrom invoking a language translation service, to enter a number of at least one called party and a language preference for translation of information generated by the called party, the second front end processor prompting the called party to enter a language preference for translation of speech uttered by the calling party, the first and second front end processors automatically translating the information generated by the calling and by the called party, respectively, in accordance with the language preferences entered by the called and calling parties, respectively; and further monitoring characteristics of the information generated by the calling and called parties; and simultaneously with the translation, adjusting the characteristics of the information generated the calling and called parties to achieve synchronism therebetween.

* * * * *